United States Patent [19]
Fukatsu et al.

[11] Patent Number: 5,355,256
[45] Date of Patent: Oct. 11, 1994

[54] VIDEO SIGNAL REPRODUCING APPARATUS HAVING DIVERSE STILL PICTURE REPRODUCTION MODES

[75] Inventors: Tsutomu Fukatsu; Yoshihiro Nakatani, both of Kanagawa, Japan

[73] Assignee: Canon Kabushiki Kaisha, Tokyo, Japan

[21] Appl. No.: 982,225

[22] Filed: Nov. 25, 1992

Related U.S. Application Data

[60] Continuation of Ser. No. 586,223, Sep. 21, 1990, abandoned, which is a division of Ser. No. 209,491, Jun. 20, 1988, abandoned.

[51] Int. Cl.$^5$ .............................................. H04N 5/78
[52] U.S. Cl. ..................................... 360/10.3; 360/75; 358/909.1
[58] Field of Search ............... 360/35.1, 10.3, 36.2, 360/75; 358/338, 313, 335, 312, 321, 909

[56] References Cited

U.S. PATENT DOCUMENTS

| | | | |
|---|---|---|---|
| 4,800,447 | 1/1989 | Toba | 360/10.3 |
| 4,912,571 | 3/1990 | Sekiya et al. | 360/10.3 |

*Primary Examiner*—Andrew L. Sniezek
*Attorney, Agent, or Firm*—Robin, Blecker, Daley & Driscoll

[57] ABSTRACT

A video signal reproducing apparatus for reproducing a video signal from a recording medium includes a rotary head arranged to periodically trace the recording medium and reproduce the recorded video signal, a memory arranged to receive the video signal reproduced by the rotary head, memory control circuitry for controlling writing into and reading from the memory, a rotation controller for controlling rotation of the rotary head; and mode setting circuitry for setting the apparatus into one of a plurality of modes including first and second still picture reproduction modes. In both modes, stored signals are repetitively read from the memory with reading address resetting occurring in the course thereof. In the first mode, which involves short term reproduction, the rotary head is caused to rotate and the resetting is dependent of detection of phase detection of the rotary head. In the second mode, which involves long term reproduction, rotation of the rotary head is discontinued and resetting is attained without dependence on phase detection.

19 Claims, 10 Drawing Sheets

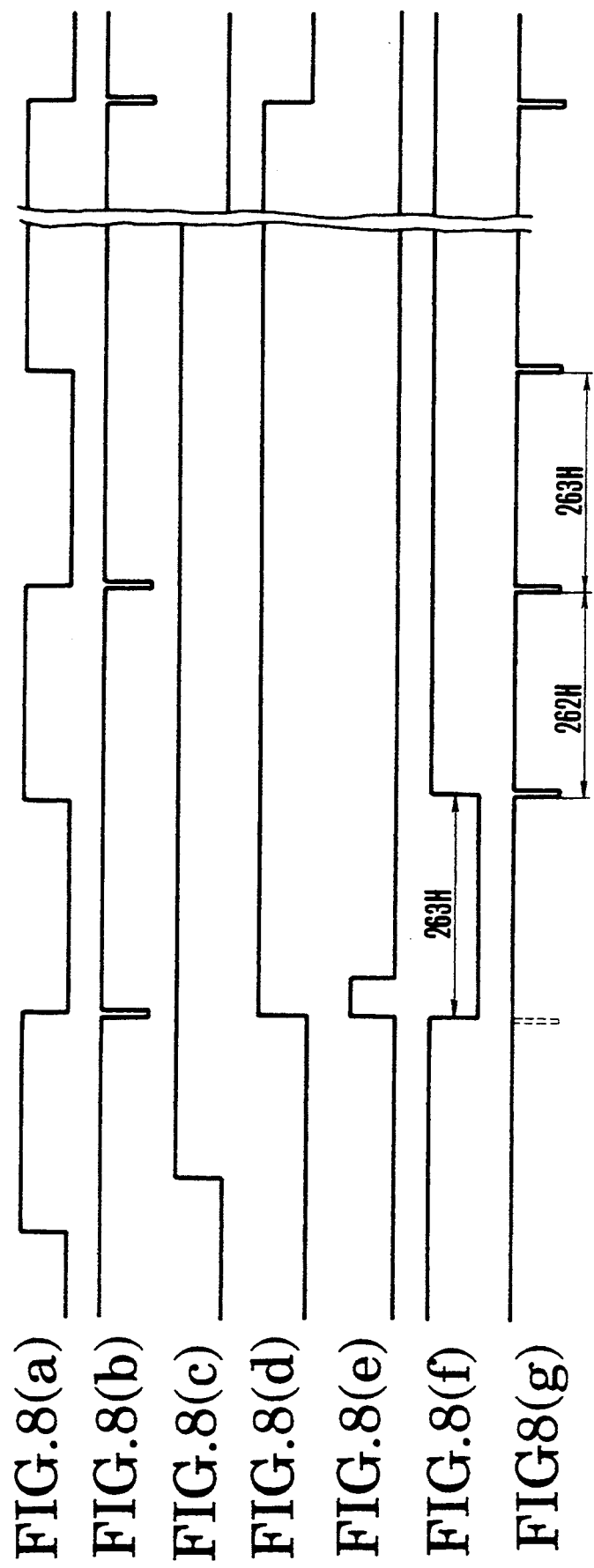

2

VIDEO SIGNAL REPRODUCING APPARATUS HAVING DIVERSE STILL PICTURE REPRODUCTION MODES

This is a continuation application under 37 CFR 1.62 of prior application Ser. No. 586,223, filed Sep. 21, 1990, now abandoned, which is a divisional application of prior application Ser. No. 07/209,491 filed Jun. 20, 1988, now abandoned.

BACKGROUND OF THE INVENTION

1. Field of the Invention

This invention relates to a video signal processing apparatus and more particularly to an apparatus which processes an interlaced video signal.

2. Description of the Related Art

The apparatuses of the kind mentioned above include, for example, a rotary two-head helical scanning type video tape recorder (hereinafter referred to as VTR) which is designed for home use. The home VTR of this kind is capable of reproducing a still picture by repeatedly tracing the surface of a video tape with a rotary reproducing head with the tape brought to a stop.

However, if the still picture reproduction is performed with the tape simply brought to a stop, the reproduced signal deteriorates in its S/N ratio and hardly gives an adequate still picture, because the tracing locus of the reproducing head is not-in parallel to the recording track formed on the tape. Then, noise bars would appear on the reproduced picture plane if the pausing position of the tape is not accurately controlled. Further, in case where the VTR is arranged to perform the so-called azimuth recording with two rotary heads, it is possible to reproduce only the records that are in tracks having one of different azimuth angles. In that case, a still picture thus reproduced is formed alternately by images having a time difference corresponding to one field between them. Such a reproduced picture is hardly presentable as a still picture.

It is, therefore, practiced to have a reproducing head specially arranged for reproduction of a still picture to repeatedly reproduce the record of one and the same track. This method, however, also requires accurate control over the pausing position of the tape. Even if the position control can be accurately accomplished, however, the S/N ratio of signal parts reproduced from the two end parts of the track is inevitably deteriorated to a greater degree than in the standard mode of reproduction (motion picture reproduction). Besides, it is necessary to take into consideration an adverse effect of a difference in relative speeds of the head and the tape between recording and reproduction.

To solve this problem, a VTR which has been recently announced is arranged to obtain a still picture by writing into a memory one field portion of a video signal reproduced during standard reproduction and by repeatedly reading it out from the memory.

This VTR is arranged as follows: FIG. 1 of the accompanying drawings shows in outline the arrangement of the reproducing system of the VTR. FIGS. 2(a–i) to 2(d–iii) show in a timing chart the operation of the various parts of the FIG. 1. Rotary heads HA and HB are arranged to revolve at a phase difference of 180 degrees along the outer circumferential surface of a rotary head cylinder with a tape wrapped at least 180 degrees around the cylinder. These heads HA and HB have different azimuth angles from each other. Another head 2 is arranged to detect the rotation phases of the heads HA and HB and to produce a rectangular wave signal (hereinafter referred to as PG signal) as shown in FIG. 2(a–l). If the recorded signal is, for example, an NTSC TV signal, the PG signal is of 30 Hz. A head switch 4 is controlled by the PG signal. A reproduced video signal is continuously obtained from the head switch 4. The reproduced video signal is supplied to a Y/C separation circuit 6 which is arranged to separate the signal into a frequency modulated luminance signal (hereinafter referred to as a signal FM-Y) and a low-band converted carrier chrominance signal (hereinafter referred to as a low-band signal C). The signal FM-Y which is separated by the circuit 6 is supplied to a luminance signal processing circuit 8 to undergo such processes as frequency demodulation, etc. The low-band signal C is supplied to a chrominance signal processing circuit 10 to undergo such processes as frequency conversion, etc. The base-band luminance signal and the carrier chrominance signal thus obtained are mixed together at a mixer 12 to obtain a reproduced composite color video signal. In carrying out a standard reproducing operation which is motion picture reproduction, the connecting position of a switch 14 is on one side N thereof. Then, the output of the mixer 12 is produced via the switch 14 to an output terminal 16.

In the case of a still picture reproduction, the VTR operates as follows: A terminal 18 is arranged to receive a still instruction signal the level of which becomes high when an instruction is given for still picture reproduction by means of an operation part which is not shown during the standard reproduction. Another terminal 20 is arranged to receive a clock signal of a color subcarrier frequency (hereinafter referred to as a frequency fsc) obtained by means of, for example, the chrominance signal processing circuit 10, etc. The frequency of the clock signal thus received is stepped up by a PLL 22 into driving pulses to be used for driving a timing controller 26. Meanwhile, a clock signal which is obtained by frequency-dividing the output of the PLL 22 by a frequency divider 24 is also supplied to the timing controller 26. The timing controller 26 is arranged to control the timing of operation of the various parts on the basis of these clock signals.

D-flip-flops (hereinafter referred to as D-FFs) 28 and 30 are arranged such that: The above stated PG signal is supplied to the terminal D of the D-FF 28 and the Q output of the D-FF 28 is supplied to the terminal D of the D-FF 30 respectively. To the clock terminals of the D-FFs 28 and 30 is supplied from the timing controller 26 a clock signal which is of a sufficiently high frequency, such as the frequency fsc. Pulses produced from the $\overline{Q}$ terminal of the D-FF 30 are of an inverse phase and a delay of 1/fsc relative to that of pulses produced from the Q terminal of the D-FF 28. Therefore, when these pulses are supplied to an exclusive OR (EXOR) circuit 32, low level pulses are obtained only at the edge parts of the PG signal. Further, the logical sum of the output of the EXOR circuit 32 and the PG signal is obtained at an OR gate 34. By this, there is obtained a pulse signal (hereinafter referred to as frame pulse) which is of a two-field period and is at a low level only at the fall edge of the PG signal.

The still instruction signal supplied to the terminal 18 is synchronized at a D-FF 36 with the frame pulse produced from the OR gate 34. A monostable multi-vibrator (hereinafter referred to as MM) 38 is triggered by the rise of the Q output of the D-FF 36. Then, the MM 38 produces a one-shot pulse. The one-shot pulse produced from the MM 38 sets a set-reset flip-flop (hereinafter referred to as SR-FF) 40. The $\bar{Q}$ output of the SR-FF 40 is arranged to effect switching between writing and reading actions on a memory 42. In other words, the memory 42 is arranged to be rendered writable at a fall of the PG signal immediately after the level of the still instruction signal becomes high.

The frame pulse which is produced from the OR gate 34 is arranged to be supplied via an AND gate 44 to the reset terminal RST of an address counter 46 and also to the clear terminal CL of a 263H detection circuit 48 which will be described later herein. By this, the address counter 46 and the circuit 48 are set into their initial states respectively.

Writing into the memory 42 is performed in the following manner: The composite color video signal which is produced from the mixer 12 is supplied to a front low-pass filter (LPF) 50 to have the frequency band thereof limited there. After the LPF 50, the composite video signal is digitized by an analog-to-digital (A/D) converter 52. Input-output interfaces (IFs) 54 and 56 are arranged to control the data transfer speed, the transfer timing, the mode, etc. of the memory 42.

An NTSC signal consists of 262.5 horizontal scanning lines for one field. Assuming that the video signal is of the NTSC color system, if the memory 42 is simply arranged to store a 262.5 horizontal scanning line portion of the video signal, repeated reading of the stored signal from the memory 42 would bring about a skew as shown in FIGS. 2(a-i) to 2(b-iii). FIGS. 2(a-ii) and 2(a-iii) show the vertical synchronizing signal (hereinafter referred to as a VD signal) and the horizontal synchronizing signal (hereinafter referred to as an HD signal), respectively, of a composite color TV signal supplied to the LPF 50. FIG. 2(b-i) shows a writing/reading change-over signal to be obtained in case that the 262.5H portion of the signal is to be stored in synchronizm with the PG signal (FIG. 2(a-i)). FIGS. 2(b-ii) and 2(b-iii) show the VD and HD signals of a signal obtained by writing and reading in and from the memory 42 in this case. As shown, there arises a skew of $\frac{1}{2}$H.

In view of this, a period has been set for writing into the memory 42 at 263H and to alternately read out for a period of 262H and for a period of 263H. FIG. 2(c-i) shows a writing/reading change-over signal which is arranged on the above stated concept. FIGS. 2(c-ii) and 2(c-iii) respectively show the VD and HD signals obtained in this instance.

In the case of FIG. 1, the writing period is set at 263H according to the above stated method. When the address counter 46 counts the addresses for the period of 263H, the 263H detection circuit 48 produces a pulse, which resets the SR-FF 40 and also resets the address counter 46. As a result, the level of the $\bar{Q}$ output of SR-FF 40 becomes high. Then, data stored at the address of the memory 42 designated by the address counter 46 is read out.

The data read out from the memory 42 is supplied via the IF 56 to a digital-to-analog (D/A) converter 58 to be converted into an analog signal. The analog signal thus obtained is supplied to a switch terminal on one side M of the switch 14 after the band thereof is limited by a rear LPF 60. The switch 14 is controlled by the output of an AND gate 62 which is arranged to obtain a logical product of the Q output of the D-FF 36 and the $\bar{Q}$ output of the SR-FF 40. When the reading action on the memory 42 begins, the connecting position of the switch 14 is shifted to the side M thereof. Further, the A/D converter 52, the IFs 54 and 56 and the D/A converter 58 are under the control of clock pulses produced from the timing controller 26.

After the lapse of the period of 262H following the reading action on the memory 42, a frame pulse is supplied from the OR gate 34 to the reset terminal of the address counter 46 to reset the reading address of the memory 42. For a next field, the address counter 46 operates until a pulse is produced from the 263H detection circuit 48. Then, data for 263H is read out from the memory 42. After that, data for 262H and data for 263H are alternately read out until the level of the still instruction signal becomes low. Then, the connecting position of the switch 14 is shifted to the other side N thereof and the VTR comes back to the standard reproduction mode thereof by a frame pulse first produced after the level of the still instruction signal is shifted to the low level.

The VTR arranged in the above stated manner is capable of giving an adequate still picture having no skew. However, in case that a still picture is to be appreciated over a long period of time with this VTR, the rotary head traces the same part of the tape for a long period of time and tends to damage the tape. If the rotary head is brought to a stop to avoid the trouble, the video signal to be reproduced from the tape cannot be synchronized any longer with the still picture signal being produced and, under such a condition, an output image would be greatly disturbed at the time of changeover from the still picture reproducing state to a standard reproducing state.

Further, in case where a video signal having such VD and HD signals that are shown in FIGS. 2(c-ii) and 2(c-iii) is supplied to an image receiver, the presence of the VD signal at every period of 262H or 263H causes the horizontal scanning lines of the first and second fields to appear in the same position on the picture plane. In case that the image receiver has a large picture plane, a still picture thus obtained becomes excessively coarse as the horizontal scanning lines are spaced too much.

To solve this problem, the video signal has inserted therein pulses (artificial VD signal) which are separately generated in a cycle of 262.5H. However, this solution necessitates an artificial VD signal insertion circuit to be disposed behind the memory and is not desirable as it causes an increase in the hardware arrangement of the VTR.

SUMMARY OF THE INVENTION

It is a general object of this invention to solve the above stated problems of the prior art.

It is a more specific object of the invention to provide a video signal processing apparatus which is capable of giving a presentable still picture with adequate interlaced scanning.

It is another object of the invention to provide a video signal processing apparatus which is capable of giving a still picture of interlaced scanning by simply performing a memory addressing process without recourse to a complex circuit arrangement.

Under this object, a video signal processing apparatus which is arranged according to this invention comprises: a memory capable of storing at least an (n+1) horizontal scanning line portion of an interlaced video signal having (2n+1) horizontal scanning lines for one frame which consists of two fields, n being an integer; input means arranged to supply the interlaced video signal to the memory; writing address control means for controlling a writing address of the memory, the writing address control means being arranged to reset the writing address of the memory in response to a front edge of a vertical synchronizing signal included in the interlaced video signal received by the input means; and reading address control means for controlling a reading address of the memory, the reading address control means being arranged to reset the reading address of the memory alternately at an interval of n horizontal scanning periods and at an interval of (n+1) horizontal scanning periods.

It is a further object of the invention to provide a video signal reproducing apparatus which is capable of performing still picture reproduction over a long period of time without imposing any load on a recording medium and a short time still picture reproducing operation which can be adequately shifted to a motion picture reproducing operation.

Under that object, an apparatus arranged according to this invention to reproduce a video signal from a recording medium having the video signal recorded in many helical tracks, each of which has one field portion of the video signal recorded therein, comprises a rotary head arranged to periodically trace the recording medium; a memory arranged to receive the video signal reproduced by the rotary head and capable of storing at least one field portion of the video signal; memory control means for controlling writing and reading actions on the memory; rotation control means for controlling the rotation of the rotary head; and mode setting means for setting the apparatus into one of a plurality of modes including a first still picture reproduction mode and a second still picture reproduction mode, in the first still picture reproduction mode the memory control means causing one field portion of the video signal stored at the memory to be repeatedly read out while the rotation control means causes the rotary head to rotate at a given speed, and in the second still picture reproduction mode the memory control means causing one field portion of the video signal stored at the memory to be repeatedly read out while the rotation control means brings the rotation of the rotary head to a stop.

The above and other objects and features of the invention will become apparent from the following detailed description of embodiments thereof taken in connection with the accompanying drawings.

BRIEF DESCRIPTION OF THE DRAWINGS

FIGS. 8(a) to 8(g) show in a timing chart the wave forms of the outputs of various parts of FIG. 7.

DETAILED DESCRIPTION OF THE PREFERRED EMBODIMENTS

Figure 2:
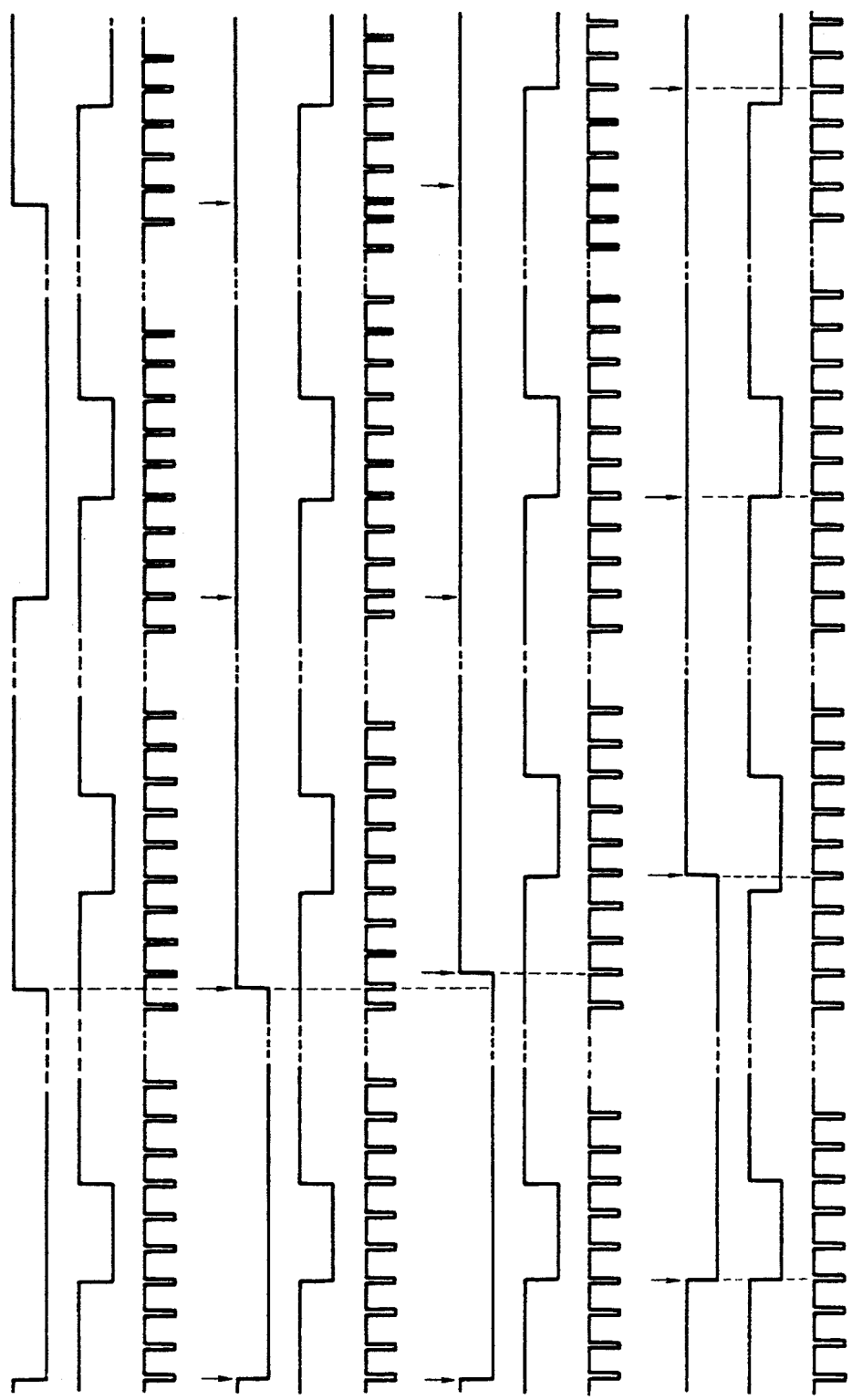
FIGS. 2(a–i)–2(a–iii), 2(b–i)–2(b–iii), 2(c–i)–2(c–iii), 2(d–i) to 2(d–iii) show in a timing chart the wave forms of the outputs of various parts of FIGS. 1 and 3.

The following describes embodiments of the invention with reference to the accompanying drawings:

The concept of an embodiment of the invention is first described with reference to FIGS. 2(d–i), 2(d–ii) and 2(d–iii). FIG. 2(d–i) shows a writing/reading control pulse for writing and reading into and from a memory. Reading is performed when the pulse is at a high level. Writing is performed when the pulse is at a low level. FIGS. 2(d–ii) and 2(d–iii) show the VD and HD signals included in a video signal obtained under the control of the writing/reading control pulse. A 263H portion of the video signal is written into the memory beginning with the falling of the VD signal (FIG. 2(a–ii)) of the input video signal. A 262H portion of the signal is read out in the order in which the signal is written in. Following this, the 263H portion of the signal is read out. The signal is thus read out alternately in a quantity corresponding to 262H and in another quantity corresponding to 263H. During the last one H part of the 263H portion of the video signal being thus read out, the leading part of the VD signal is read out for a period of 0.5H. Therefore, the leading part of the VD signal is read out from the memory at every period of 262.5H. The scanning lines of a reproduced image obtained by the video signal thus read out from the memory are interlaced.

Figure 1:
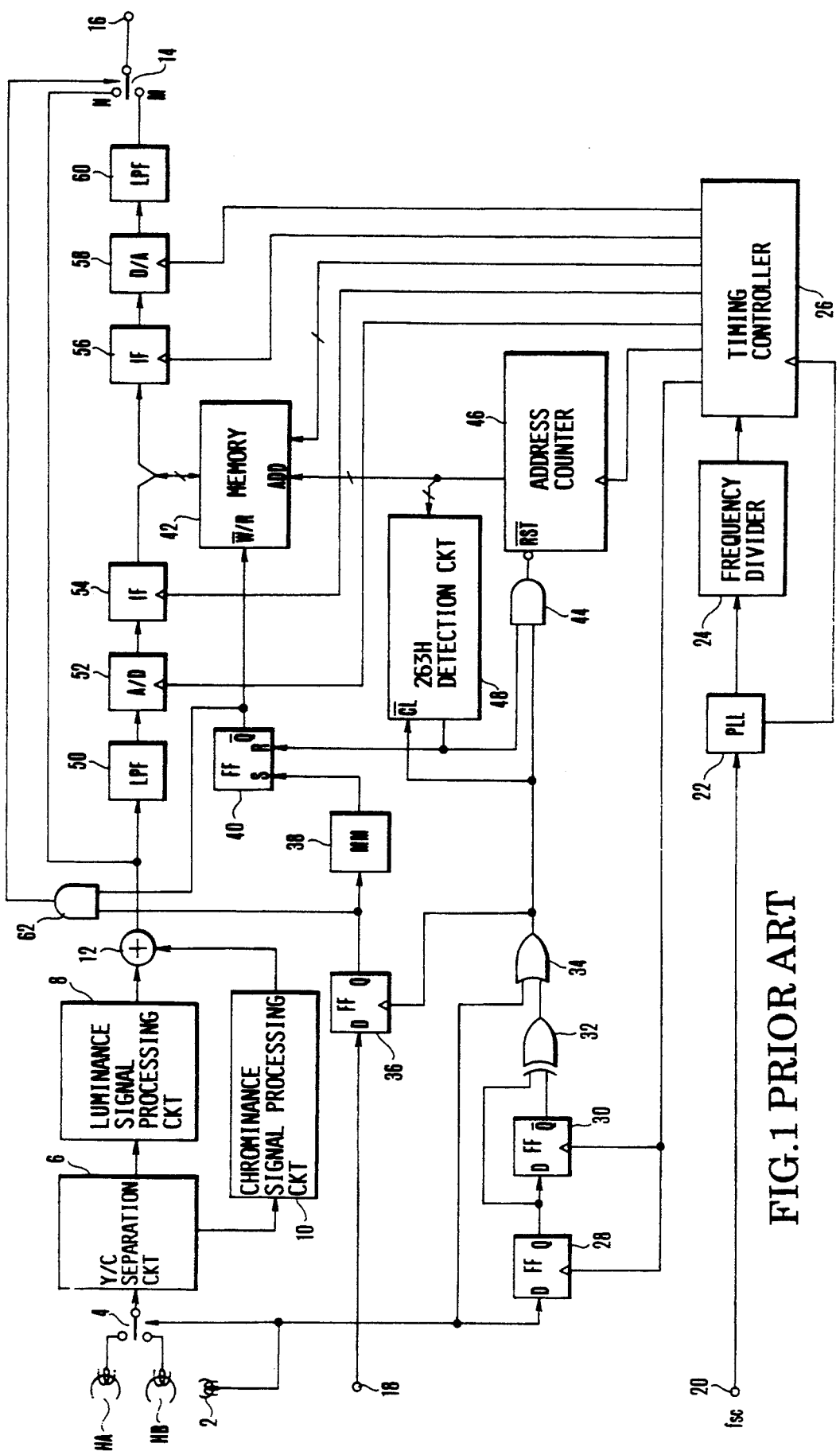
FIG. 1 is a diagram showing by way of example the arrangement of the reproducing system of the conventional VTR.
Figure 3:
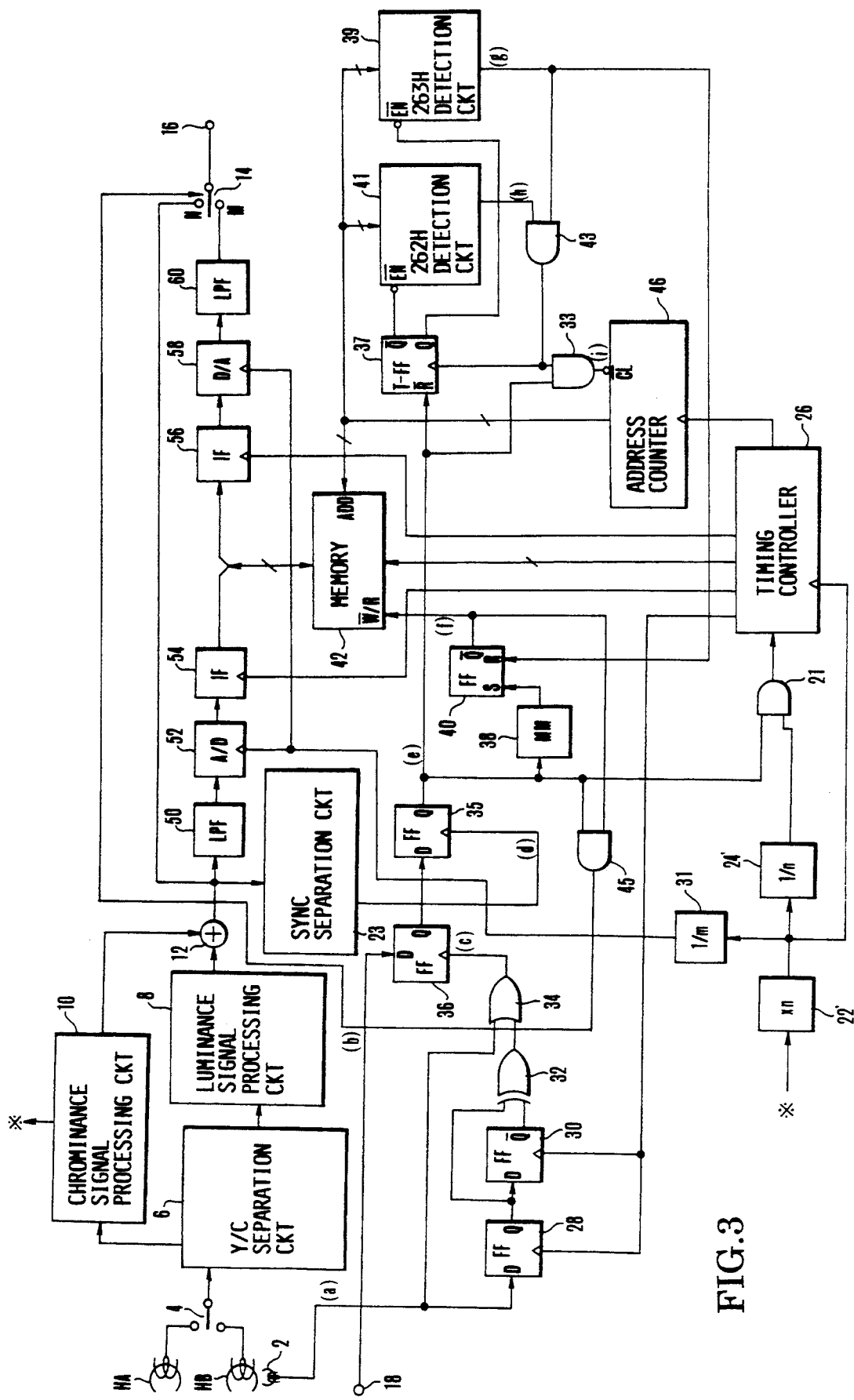
FIG. 3 is a diagram showing the arrangement of the reproducing system of a VTR which is arranged as an embodiment of this invention.

An embodiment of this invention in which the invention is applied to still picture reproduction by a helical scanning VTR is arranged as described below:

FIG. 3 shows in a block diagram the arrangement of the reproducing system of a VTR arranged as the embodiment of the invention. FIGS. 4(a) to 4(i) show in a timing chart the wave forms of the outputs of various parts of FIG. 3. In FIG. 3, the same component parts as those shown in FIG. 1 are indicated by the same reference numerals and the details of them are omitted from description. A step-up device 22' is arranged to receive a clock signal of a color subcarrier frequency fsc obtained from a chrominance signal processing circuit 10 and to step up the frequency by n times to obtain a driving pulse to be used for driving a timing controller 26. The output of the n step-up device 22' is frequency-divided by an n frequency divider 24' to obtain a clock signal. The clock signal thus obtained is supplied via an AND gate 21 to the timing controller 26. The timing controller 26 is arranged to control the various parts of the VTR on the basis of the clock signal.

Figure 4:
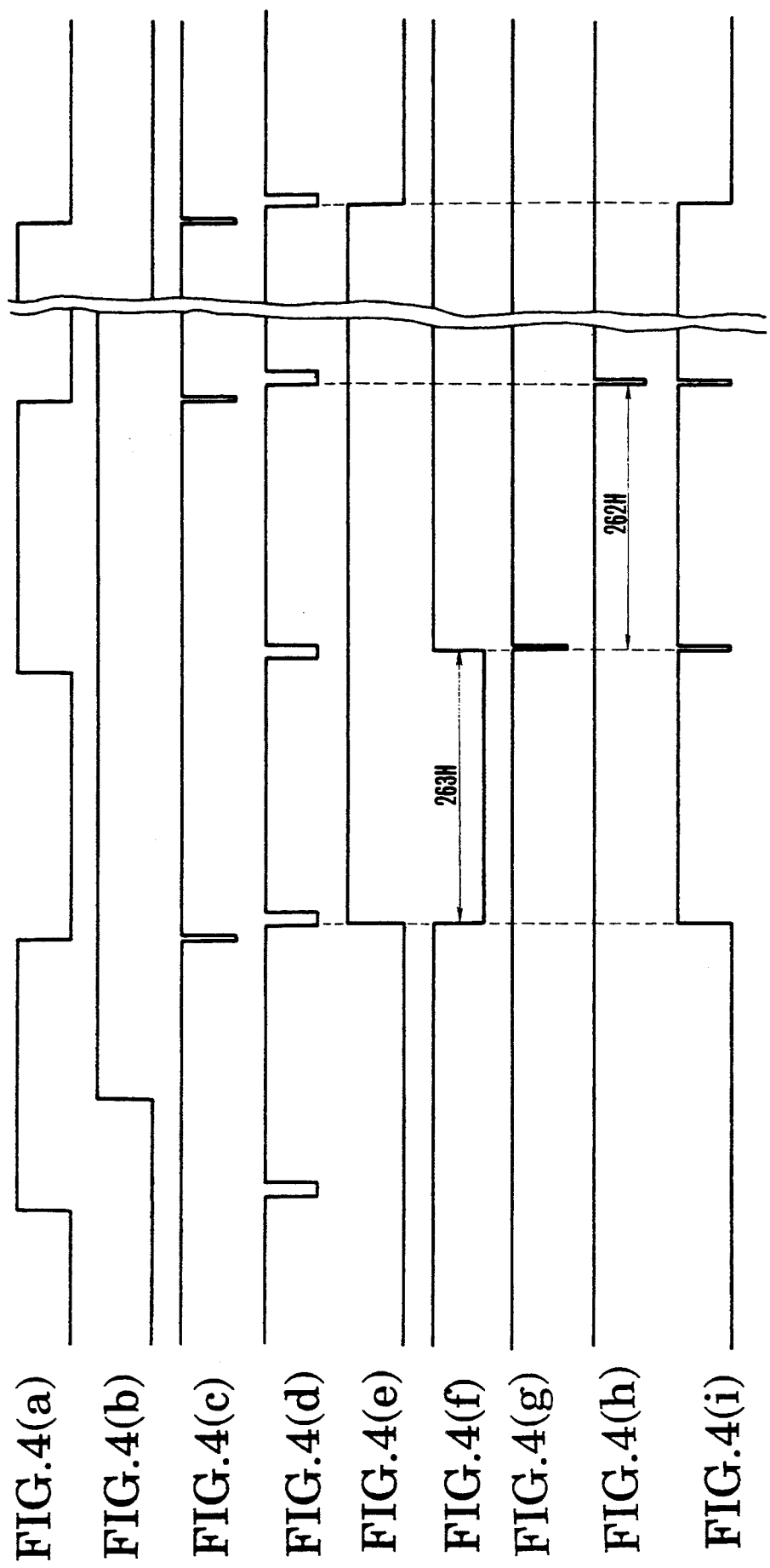
FIGS. 4(a) to 4(i) show in a timing chart the operation of various parts of FIG. 3.

A terminal 18 is arranged to receive a still instruction signal which is shown in FIG. 4(b). The still instruction signal is synchronized by a D-FF 36 with a frame pulse which is produced from an OR gate 34 and which is shown in FIG. 4(c). The Q output of the D-FF 36 is supplied to the terminal D of a D-FF 35. The D-FF 35 also receives a VD signal which is shown in FIG. 4(d) and which is separated from the output of a mixer 12 by a sync separation circuit 23. An MM (monostable multivibrator) 38 is arranged to be triggered by the rise of the Q output of the D-FF 35 which is shown in FIG. 4(e) and which is in synchronism with the falling edge of the VD signal. The MM 38 produces one shot pulse when it is thus triggered. The one shot pulse is applied to an SR-FF (set-reset flip-flop) 40 to set the latter. The $\overline{Q}$ output of the SR-FF 40 which is shown in FIG. 4(f) is used for effecting change-over between writing and reading actions on a memory 42. More specifically, the memory 42 is brought into a writing state by the timing of a fall taking place in the VD signal immediately after the level of the still instruction signal coming via the terminal 18 becomes high. The timing at which the writing action begins on the memory 42 is allowable to be within a period of 0.5H from the fall timing of the VD signal for obtaining the same advantageous effect of the embodiment.

When the level of the Q output of the D-FF 35 becomes high, the AND gate 21 allows the clock signal produced from the n frequency divider 21 to be supplied to the timing controller 26; and an AND gate 33 cancels the cleared state of an address counter 46 to permit a writing action to begin on the memory 42. Further, at this time, the reset state of a T type flip-flop (hereinafter referred to as T-FF) 37 is also cancelled.

The writing action on the memory 42 is as follows: A composite color video signal produced from a mixer 12 is supplied to a front LPF (low-pass filter) 50 to have its frequency and band limited thereby. After that, the video signal is digitized by an A/D converter 52 which is arranged to operate under the control of a signal obtained through an m frequency divider 31 by frequency-dividing by a value m the output of the n step-up device 22'. Input-output interfaces (hereinafter referred to as IFs) 54 and 56 are arranged to control the data transfer speed, the transfer timing, the mode, etc. of the memory 42. The IFs 54 and 56 operate on the basis of a clock signal produced from the timing controller 26.

When the VTR is in the above stated condition of having begun writing data into the memory 42, the levels of the $\overline{Q}$ and Q of the T-FF 37 are high and low respectively. A 263H detection circuit 39 is in an operative state. A 262H detection circuit 41 is in an inoperative state. These detection circuits 39 and 41 are arranged to produce negative pulses when the address counter 46 counts addresses for 263H and 262H respectively. Therefore, when a portion of the video signal for 263H has been stored by the memory 42 as addressed by the address counter 46, the 263H detection circuit 39 produces a negative pulse as shown in FIG. 4(g). This pulse becomes a clearing pulse as shown in FIG. 4(i) and is applied via the AND gates 43 and 33 to the address counter 46 to clear it for address resetting.

Meanwhile, the above stated pulse is supplied also to the reset terminal of the SR-FF 40. This changes the level of the $\overline{Q}$ output of the SR-FF 40 to a high level to bring the memory 42 into a reading state. Further, the level of the output of the AND gate 45 changes to a high level to shift the connecting position of the switch 14 to one side M thereof. The output of the AND gate 43 is supplied also to the check terminal of the T-FF 37. This causes the level of the $\overline{Q}$ output and Q output of the T-FF 37 to change to low and high levels respectively. As a result, the 262H detection circuit 41 becomes operative and the 263H detection circuit inoperative respectively. With the address counter 46 reset in this manner, the data is read out from the memory 42 according as addressed by the address counter 46. The data thus read out from the memory 42 is converted into an analog signal by a D/A converter 58 through the IF 56. The analog signal thus obtained is supplied to a rear LPF 60 to have its frequency band limited there. The output of the LPF 60 is supplied to the terminal of the switch 14 on the side M thereof. Since the connecting position of the switch 14 is then on the side M as mentioned above, the signal read out from the memory 42 is allowed to be produced from a terminal 16.

With a process of reading out from the memory 42 having commenced in this manner, when a 262H portion of the video signal is read out, the 262H detection circuit 41 produces a negative pulse as shown in FIG. 4(h). This pulse resets the address counter 46 and inverts the output of the T-FF 37. In this manner, the 262H detection circuit 41 and the 263 detection circuit 39 thereafter alternately become operative to alternately read out the 262H portion of the video signal and the 263H portion thereof. This arrangement ensures that an interlaced still picture signal can be obtained without any skew.

After that, when the still picture reproduction mode is cancelled with the level of the still instruction signal becoming low, the level of the Q output of the D-FF 36 is changed to a low level by a pulse produced from an OR gate 34 immediately after the cancellation of the still picture reproduction mode. Then, the output level of the D-FF 35 is changed to a low level by the fall of the VD signal which takes place immediately after the change. AS a result, the operation of the address counter 46 comes to a stop. The connecting position of the switch 14 shifts to another side N thereof to bring the VTR into a motion picture reproduction mode.

In the case of the VTR of this embodiment, the heads HA and HB are rotating during the process of still picture reproduction. Meanwhile, the capstan of the VTR remains in repose. As shown in FIGS. 2(d–i) and 2(d–ii), there is obtained a still image signal in which the fall of the VD signal appears at every period of 262.5H and the HD signal in a continuous manner. In other words, the VTR gives an adequate still picture which has interlaced scanning lines and has no skew.

While the processing arrangement of this invention is applied to the reproducing system of the VTR in the case of the embodiment described, a still picture having interlaced scanning lines and having no skew is likewise obtainable by storing a 263H portion of an NTSC signal produced from some other apparatus, such as a TV tuner or the like.

Figure 5:
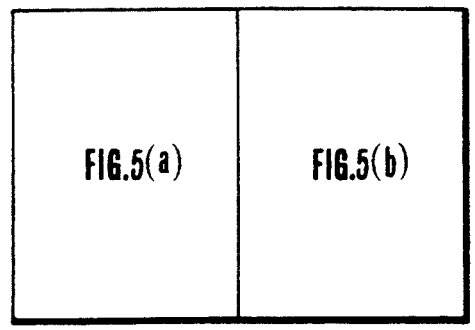
FIG. 5 is a block diagram composed of FIGS. 5(a) and 5(b) which shows a VTR arranged as another embodiment of the invention.
Figure 5A:
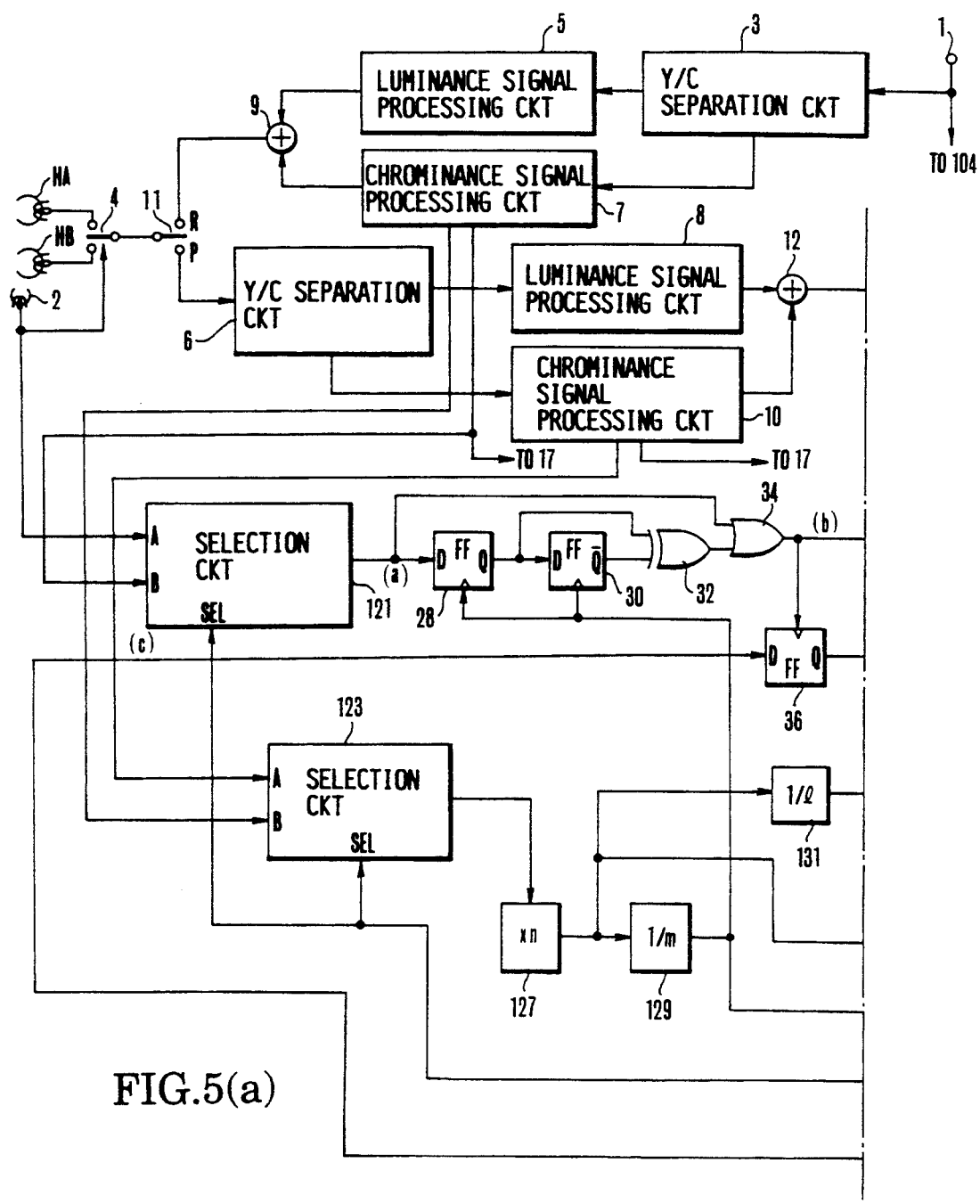
Figure 5B:
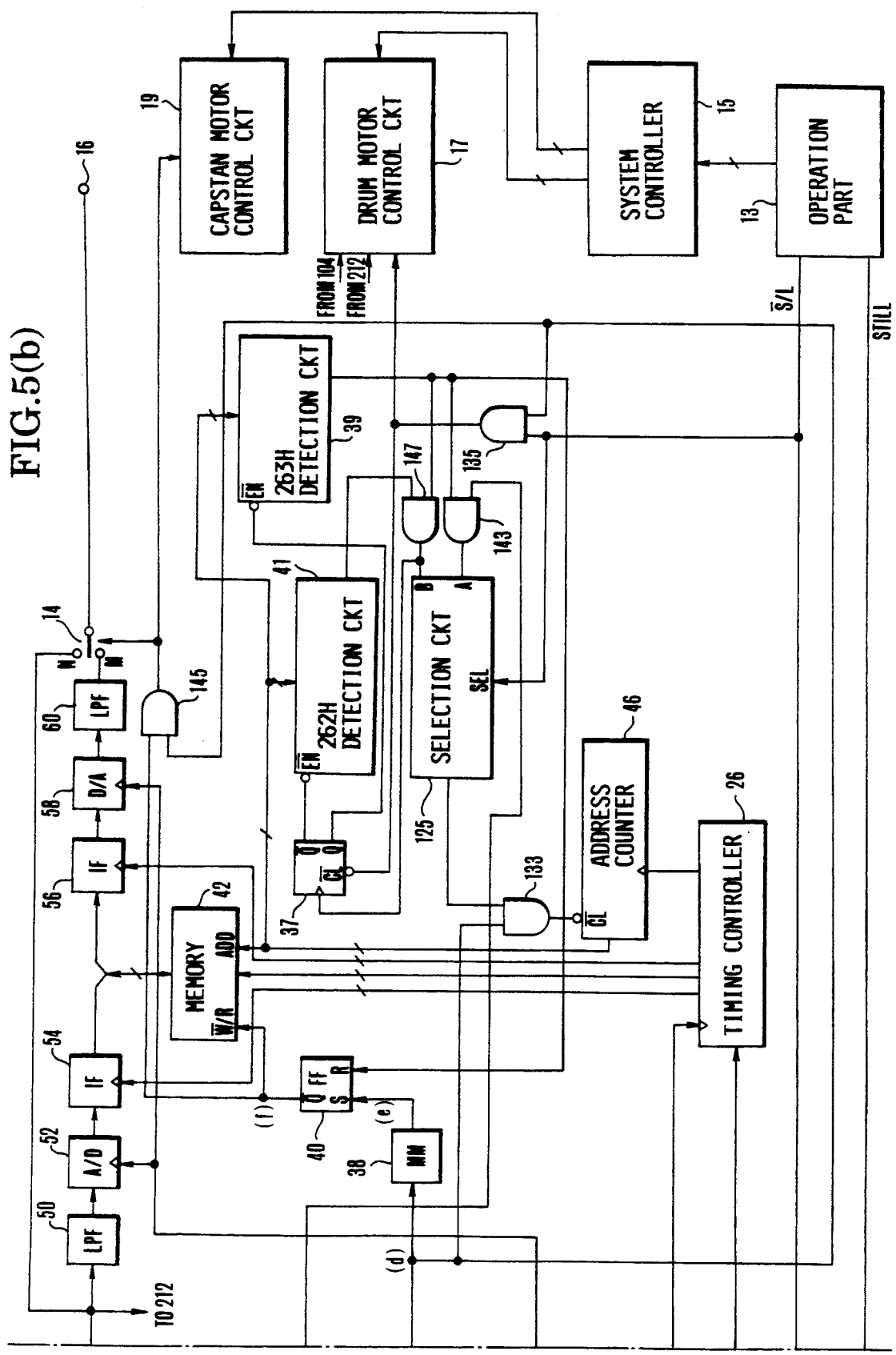

The following describes another embodiment of this invention with reference to FIGS. 5 to 8(g): FIG. 5 is a block diagram showing in outline a VTR which is arranged as the embodiment. In FIG. 5, the same component parts as those of FIG. 3 are indicated by the same reference numerals and the details of them are omitted from description.

Referring to FIG. 5, the recording operation of the VTR is first briefly described as follows: A composite color video signal which is supplied to a terminal 1 is separated into a luminance signal and a carrier chrominance signal at a Y/C separation circuit 3. The luminance signal is supplied to a luminance signal processing circuit 5 to be subjected to various processes such as frequency modulation, etc. The carrier chrominance signal is supplied to a chrominance signal processing circuit 7 to be frequency-converted into a low band chrominance signal having the lower frequency band of the frequency-modulated luminance signal FM-Y obtained from the luminance signal processing circuit 5.

The luminance signal FM-Y and the low band chrominance signal C thus obtained are mixed together by a mixer 9. The output signal of the mixer 9 is supplied to rotary heads HA and HB via a switch 11 the connecting position of which is shifted to one side R thereof during recording and another switch 4 which is arranged to be changed by the PG signal from one connecting position over to another. The output of the mixer 9 is thus recorded on a tape while forming recording tracks one after another. Further, in case that an instruction for recording is produced from an operation part 13, a system controller 15 causes a drum motor control circuit 17 to have the rotary heads HA and HB revolved at a given constant speed in synchronism with the input video signal. The system controller 15 also causes a capstan motor control circuit 19 to have a capstan which is not shown rotate at a given constant speed to cause the tape to travel at a given speed.

Figure 6:
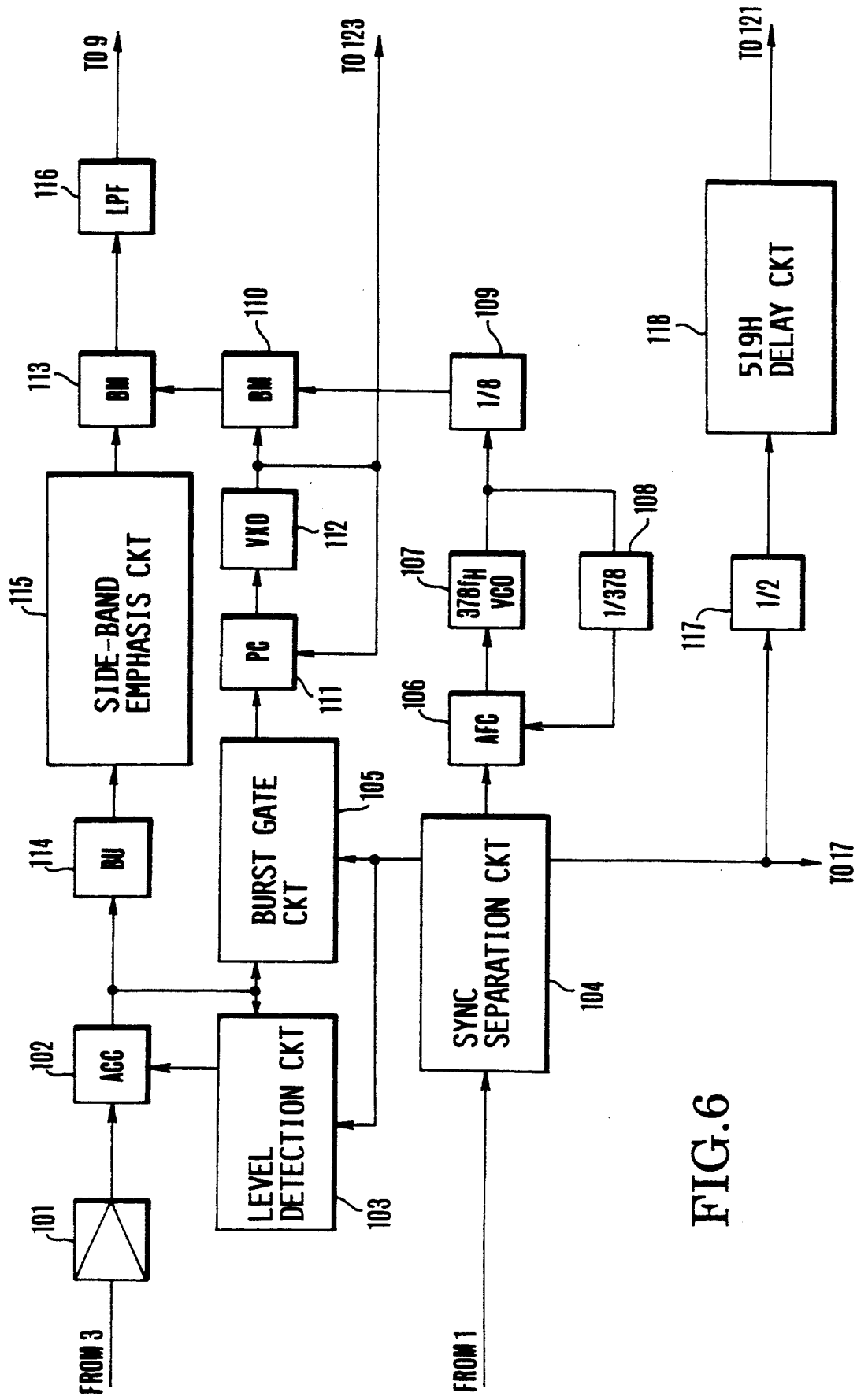
FIG. 6 is a diagram showing by way of example the arrangement of the chrominance signal processing circuit of a recording system of FIG. 5.

FIG. 6 shows a concrete example of the recording chrominance signal processing circuit 7. The carrier chrominance signal separated by the Y/C separation circuit 3 is supplied to a publicly known ACC circuit 102 via a buffer amplifier 101. The level of a burst signal extracted from an output of the ACC circuit 102 is detected by a level detection circuit 103. In response to an output of the level detection circuit 103, the ACC circuit 102 controls the level of the burst signal to be constant. A sync separation circuit 104 is arranged to separate the HD and VD signals from the input signal. The HD signal is then supplied to an AFC circuit 106, the level detection circuit 103 and a burst gate circuit 105.

An AFC circuit 106 is arranged to control the oscillation frequency of a voltage-controlled oscillator (hereinafter referred to as VCO) 107 in such a way as to have the phase of a signal of a frequency fH which is obtained by frequency-dividing the oscillation signal of the VCO 107 by means of a 1/378 frequency divider 108 coincide with that of the HD signal separated by the sync separation circuit 104. The output of the VCO 107 is frequency-divided to $\frac{1}{8}$ thereof by a frequency divider 109 and is thus made into a signal of a frequency fc (=378 fH/8). This signal is supplied to a balanced modulator (BM) 110.

Meanwhile, a color burst signal which is gated by the burst gate circuit 105 is supplied to a phase comparator (PC) 111 to have its phase compared with that of a signal obtained by the oscillation of a variable frequency-controlled oscillator (VXO) 112. The output of the PC 111 controls the oscillation frequency of the VXO 112. As a result, the VXO 112 produces a signal of a frequency fsc the phase of which is in synchronism with that of the color burst signal. That signal is supplied to the BM 110 as another input thereof. The BM 110 then produces a signal of a frequency (fc+fsc), which is supplied via a band-pass filter which is not shown to another BM 113 as a frequency converting signal.

The carrier chrominance signal which is level-controlled by the ACC circuit 102 is supplied to a burst emphasis (BU) circuit 114. Then, the side-band component of the carrier chrominance signal is emphasized by a side-band emphasis circuit 115. After that, the carrier chrominance signal is frequency-converted at the BM 113 by using the signal produced from the BM 110. The output signal of the BM 113 is supplied to an LPF 116. The output of the LPF 116 is then supplied to the mixer 9 of FIG. 5 as a carrier chrominance signal having a carrier frequency fc. FIG. 6 further includes a frequency divider 117 which is arranged to frequency-divide to $\frac{1}{2}$ the VD signal which is separated by the sync separation circuit 104; and a 519H delay circuit 118 which is arranged to delay the output of the frequency divider 117 as much as 519H. The output of the delay circuit 118 is in synchronism with the PG signal.

The standard reproducing operation of the VTR is as follows: The system controller 15 causes the connecting position of the switch 11 to be on one side P thereof to allow the output signal of the head switch 4 to be supplied to the Y/C separation circuit 6. As a result of this, a reproduced composite color video signal is obtained from the mixer 12 in the same manner as in the case of the conventional VTR shown in FIG. 1. The reproduced composite color video signal is produced from a terminal 16 via the switch 14 the connecting position of which is on the side N thereof.

Figure 7:
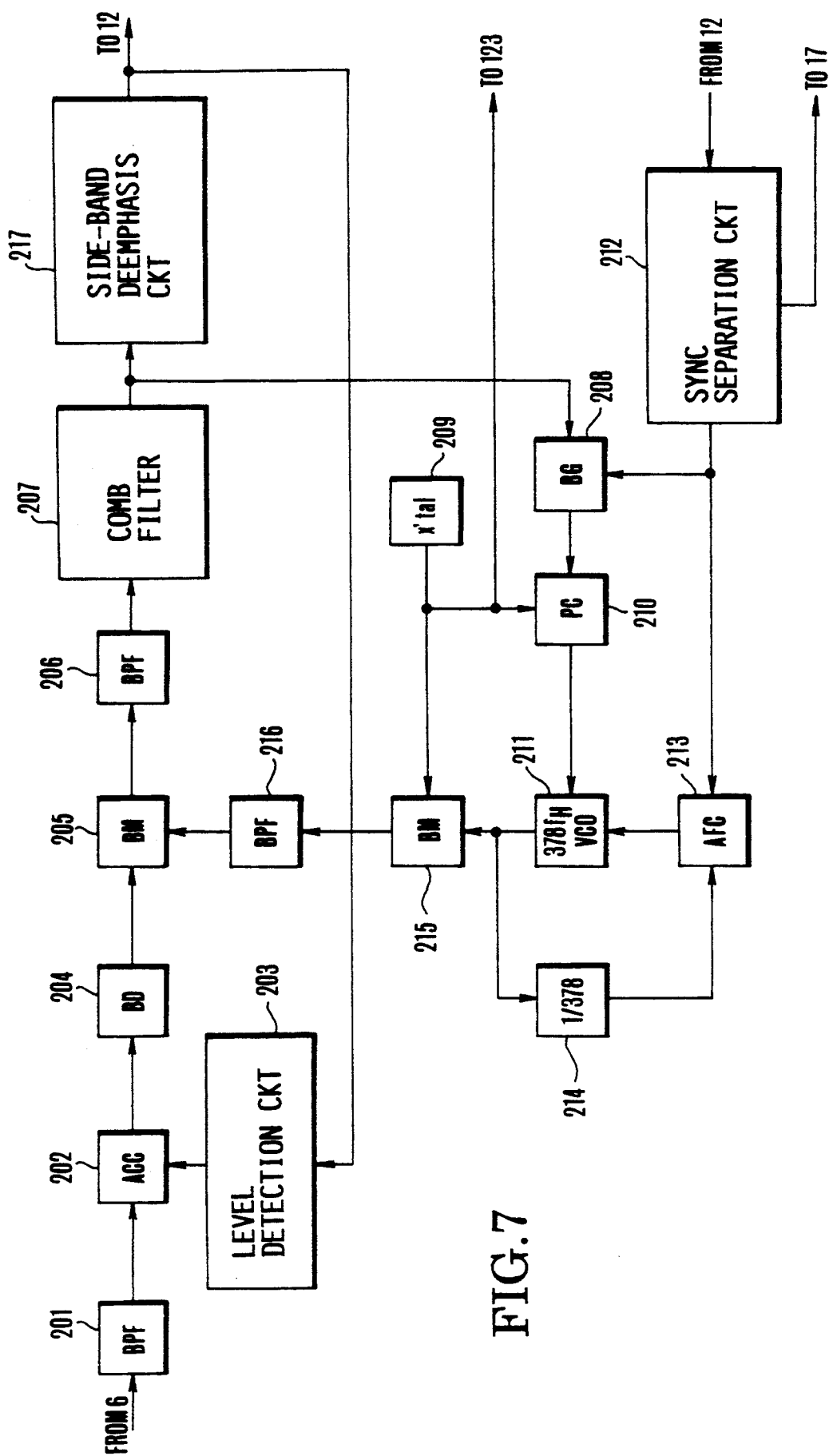
FIG. 7 is a diagram showing by way of example the arrangement of the chrominance signal processing circuit of a reproducing system of FIG. 5.

FIG. 7 shows by way of example the details of the reproduced chrominance signal processing circuit 10 of FIG. 5. Referring to FIG. 7, the low-band chrominance signal C separated by the Y/C separation circuit 6 is supplied via a BPF 201 to an ACC circuit 202. The level of the burst signal obtained at the output stage of the processing circuit 10 is detected by a level detection circuit 203. The ACC circuit 202 then controls the output signal of the BPF 201 in such a way as to make the level of the burst signal constant. The output signal of the ACC circuit 202 is supplied to a burst suppression (BD) circuit 204 to have the level of the burst signal suppressed there. The output of the circuit 204 is supplied to a BM 205 to undergo a balanced modulation with a signal which will be described later. The output of the BM 205 is supplied to a BPF 206. The BPF 206 separates a frequency band of the input signal having the frequency fsc at the center thereof. The output of the BPF 206 is supplied to a comb filter 207 to remove therefrom a noise component in the neighborhood of a frequency which is an integer times as high as the frequency fH.

A burst gate (BG) circuit 208 is arranged to separate a color burst signal from the carrier chrominance signal produced from the comb filter 207. The color burst signal is supplied to a PC 210 to be phase-compared with an oscillation signal of the frequency fsc which is produced from a quartz oscillator (X'tal) 209. A phase error voltage which is thus obtained as a result of comparison is used as a control voltage for a VCO 211 which is arranged to oscillate at a center frequency of 378 fH. A sync separation circuit 212 is arranged to separate HD and VD signals. The HD signal is supplied to an AFC circuit 213. The AFC circuit 213 is arranged to synchronize with this HD signal a signal obtained by frequency-dividing the oscillation signal of the VCO 211 to 1/378 by means of a frequency divider 214. A BM 215 is arranged to balance-modulate the output of the oscillator (X'tal) 209 and that of the VCO 211. A BPF 216 is arranged to filter a frequency component (fc+fsc) of the output signal of the BM 215 and to supply it to the BM 205 as a signal to be used for modulation.

The carrier chrominance signal produced from the comb filter 207 is supplied to a side-band deemphasis circuit 217 to have its side-band component suppressed there before it is supplied to the mixer 12.

In the case of the standard reproduction, the capstan motor control circuit 19 controls the travel of the tape to have the heads HA and HB accurately trace each of recording tracks formed on the tape. A drum motor control circuit 17 is arranged to control the revolution of the rotary heads HA and HB in such a way as to have the VD signal separated by the sync separation circuit 104 of FIG. 6 at the same phase as that of the VD signal separated by the sync separation circuit 212 of FIG. 7.

The still picture reproducing operation of the VTR is as follows: When an instruction for still picture reproduction is produced by a manual operation on the operation part 13, the level of a still instruction signal STILL, as indicated in FIG. 5, becomes high. The operator is assumed to designate beforehand either a long-time still picture reproducing mode (LS mode, for long) or a standard still picture reproducing mode (SS mode, for short). In case that the LS mode is designated, the level of a still mode designation signal $\overline{SL}$, as shown in FIG. 5, is arranged to be at a high level. In the event of the SS mode designation, this signal is at a low level. In the case of the high level of this still mode designation signal, signal selection circuits 121, 123 and 125 all produce signals received at their terminals B. In the event of the low level of the still mode designation signal, they produce signals received at their other terminals A.

In the case of still picture reproduction in the SS mode, the VTR operates as follows: Referring to FIGS. 8(a) to 8(g), the selection circuit 121, in this instance, produces the PG signal as shown in FIG. 8(a). Then, a frame pulse which is shown in FIG. 8(b) is obtained from an OR gate 34. The still instruction signal which is produced from the operation part 13 and which is shown in FIG. 8(c) is changed by the D-FF 36 into a signal which is in synchronism with the frame pulse as shown in FIG. 8(d).

Meanwhile, the selection circuit 123 produces the signal of the frequency fsc received from the X'tal 209 of FIG. 7 and supplies it to an n step-up device 127 which is composed of a PLL. The output of the step-up device 127 serves as a driving pulse for the timing controller 26 and is supplied to an m frequency divider 129 and an l frequency divider 131. The output of the l frequency divider 131 is used as the operation clock for an A/D converter 52 and a D/A converter 58. The output of the m frequency divider 129 is supplied to the timing controller 26. The timing controller 26 is arranged to produce operation clock signals for controlling the IFs 54 and 56, the memory 42, the address counter 46, etc.

The Q output of the D-FF 36 which is shown in FIG. 8(d) is supplied to the MM 38. The output of the MM 38 which is shown in FIG. 8(e) is applied to the SR-FF 40 to set it. The level of the $\overline{Q}$ output of the SR-FF 40 which is shown in FIG. 8(f) then changes to a low level to bring the memory 42 into a writing state. At this time, the level of the Q output of the D-FF 36 becomes high. Therefore, the level of the clear (CL) input of the address counter 46 is changed to a high level via the AND gate 133. As a result, the address counter 46 begins to operate to control the writing address of the memory 42.

The output of the AND gate 135 remains at a low level as the still mode designation signal is at a low level. Therefore, the flip-flop 37 is in a cleared state. The level of the Q output of the flip-flop 37 becomes low and that of the $\overline{Q}$ output high. These outputs are supplied to the enable terminals (EN) of the 263H detection circuit 39 and the 262H detection circuit 41. Therefore, the 262H detection circuit 41 remains inoperative while the 263H detection circuit 39 alone becomes operative. When a 263H portion of the video signal is written into the memory 42, the 263H detection circuit 39 generates a negative pulse. The negative pulse clears (resets) the address counter 46 coming via the AND gate 143, the selection circuit 125 and the AND gate 133. Further the pulse also resets the SR-FF 40 to make the level of the $\overline{Q}$ output of the SR-FF 40 high. As a result, the memory 42 is brought into a reading state. The output level of the AND gate 145 then changes to a high level. With the output level of the AND gate 145 becoming high, the connecting position of the switch 14 shifts from the side N to the other side M. After that, the switch 14 produces the video signal read out from the memory 42. The output of the AND gate 145 is supplied also to the capstan motor control circuit 19. With the output level of the AND gate 145 changed to a high level, the capstan motor control circuit 19 stops the capstan from rotating to bring thereby the tape to a stop.

After this, a frame pulse is supplied from the OR gate 34 to the AND gate 143 when a 262H portion of the video signal is read out from the memory 42. The frame pulse then comes to clear the address counter 46 via the selection circuit 125 and the AND gate 133. Following that, when a 263H portion of the video signal is further read out from the memory 42, the 263H detection circuit 39 generates a negative pulse. The negative pulse clears the address counter 46. The address counter 46 is thereafter repeatedly cleared in this manner to have the 262H portion of the video signal and the 263H portion of the video signal alternately read out from the memory 42. This arrangement ensures that a still picture signal is produced from the terminal 16 without any skew.

When the operation part 13 is operated to cancel the still picture reproduction mode, the level of the still instruction signal becomes low. Then, the output level of the D-FF 36 changes to a low level in synchronism with a next frame pulse. Following this, the output levels of the AND gates 133 and 145 become low. The operation of the address counter 46 comes to a stop. The capstan motor control circuit 19 causes the capstan to have the tape travel at a speed for standard reproduction. The connecting position of the switch 14 is shifted to the other side N. Then, a reproduced signal obtained in the standard reproduction mode comes to be produced from the terminal 16. In this case, the rotary heads HA and HB are allowed to continuously revolve even during the process of still picture reproduction. The address counter 46 is, therefore, repeatedly reset in synchronism with the PG signal. This arrangement ensures that the VD signal included in the video signal produced from the terminal 16 does not deviate from predetermined intervals and thus never causes any disturbance in the reproduced picture even when the VTR is shifted from the still picture reproduction mode back to the standard reproduction mode.

Before the description of the operation of the VTR in the LS mode, control over the drum motor for the standard reproduction is described as follows: The VTR is assumed to have a composite video signal supplied to the terminal 1 either from a video camera or a video tuner and the circuits within its recording system remain in their operative states even while the VTR is in its reproducing state. The VD signal which is produced from the sync separation circuit 104 of FIG. 6 and the VD signal which is produced from the sync separation circuit 212 of FIG. 7 are being received at the drum motor control circuit 17. The revolution of the heads HA and HB is controlled by the circuit 17 to have the phases of these VD signals coincide with each other.

When the LS mode is designated for still picture reproduction, the VTR operates as follows: The still mode designation signal, in this instance, is at a high level. All the selection circuits 121, 123 and 125 produce the signals coming to their sides B. The selection circuit 121 produces a signal of a rectangular wave of 30 Hz which is synchronized with the PG signal produced from the delay circuit 118 of FIG. 6. The wave form of this signal is as shown in FIG. 8(a). The wave forms shown in FIGS. 8(a) to 8(f) remain the same both in the SS mode and LS mode. In the case of FIG. 8(g), however, a wave form part indicated by a broken line is obtained solely in the SS mode.

The OR gate 34 produces a pulse in synchronism with the falling edge of the rectangular wave signal produced from the selection circuit 121. The selection circuit 123 produces a signal of the frequency fsc produced from the VXO 112 of FIG. 6. The timing controller 26 is driven on the basis of this signal. In synchronism with the pulse output of the OR gate 34 which is shown in FIG. 8(b) and which is obtained immediately after the level of the still instruction signal (FIG. 8(c)) becomes high, the level of the Q output of the D-FF 36 (FIG. 8(d)) changes to a high level. By this, the cleared state of the address counter 46 is cancelled to render it operative. Meanwhile, with the level of the Q output of the D-FF 36 having become high, the MM 38 generates a pulse to set the SR-FF 40. This pulse brings the memory 42 into a writing state. At this time, the output level of the AND gate 135 also changes from a low level to a high level. The high level output cancels the cleared state of the FF (flip-flop) 37. Under this condition, the 263H detection circuit 39 is in an operative state. When the 263H portion of the video signal is written into the memory 42, the 263H detection circuit 39 produces a negative pulse. The negative pulse comes via the AND gate 147, the selection circuit 125 and the AND gate 133 to clear the address counter 46. The SR-FF 40 is also reset. The memory 42 then comes to assume a reading state. The output level of the AND gate 145 changes to a high level. The connecting position of the switch 14 is shifted to the side M thereof. The capstan motor control circuit 19 stops the capstan from rotating to bring the travel of the tape to a stop.

The drum motor control circuit 17 has the output of the AND gate 135 supplied thereto. In the case of the LS mode, the level of this output of the AND gate 135 changes to a high level when writing begins on the memory 42. In response to this output of the AND gate 135, the drum motor control circuit 17 brings drum rotation to a stop after completion of the process of writing the 263H portion of the video signal on the memory 42. This stops the heads HA and HB from revolving.

The output of the AND gate 147 is supplied to the clock terminal of the FF 37. The level of the $\overline{Q}$ output of the FF 37 changes to a high level to render the 263H detection circuit 39 inoperative and the 262H detection circuit 41 operative. Therefore, when the 262H portion of the video signal is read out after commencement of reading from the memory 42, the 262H detection circuit 41 produces a negative pulse to reset the address counter 46. At the same time, the output of the FF 37 is inverted. Following this, the 263H detection circuit 39 again become operative. The 262H detection circuit 41 and the 263H detection circuit 39 thus alternately become operative to read out the 262H portion of the video signal and the 263H portion of the video signal alternately from the memory 42. By virtue of this arrangement, the VTR is capable of producing a still image signal with no skew.

After that, the LS mode is cancelled when the level of the still instruction signal becomes low. Then, immediately after the cancellation of the LS mode, the pulse output of the OR gate 34 changes the level of the Q output of the D-FF 36, which is shown in FIG. 8(d), to a low level. The operation of the address counter 46 comes to a stop. The connecting position of the switch 14 shifts to the other side N. The capstan motor control circuit 19 causes the capstan to rotate to have the tape travel at a given speed. By this, a motion picture can be reproduced continuously from the reproduced still picture.

The above stated arrangement of the embodiment, enables the VTR to shift from the short-time still picture reproduction mode to the motion picture reproduction mode without disturbing the reproduced picture and, in the event of the long-time still picture reproduction mode, to obtain a still picture with no skew and without causing any damage to the tape. Further, in the case of the VTR of this embodiment, a signal which is obtained by dividing into ½ the frequency of the VD signal included in the video signal received at the terminal 1 and by delaying it is used for controlling the start timing of the writing process on the memory 42. However, since the heads HA and HB are revolving at the time of commencement of writing, the falling edge of the PG signal may be used for controlling the writing start timing like in the case of the SS mode.

Further, in the case of LS mode, the timing controller 26 is arranged to operate on the basis of the output of the controlled oscillator 112 which is included in the recording chrominance signal processing circuit 7. However, this arrangement may be changed to use the output of the X'tal 202 which is used for the SS mode by allowing it to operate in a free running state.

Further, in shifting from the still picture reproducing mode to the motion picture reproducing mode, the capstan and the drum are assumed to immediately follow the shift in the foregoing description. In actuality, however, they probably require some period of time before their rotation reaches a normal constant state for the motion picture reproduction after the change-over. This problem, however, can be solved by allowing the rotation of the capstan and the drum to build up immediately after an instruction is given by the operation part 13 for change-over from the still picture reproduction to the motion picture reproduction and by allowing the level of the still instruction signal to become low after stabilization of the rotating parts. The period of time after the instruction for shifting the mode and before the level of the still instruction signal is allowed to become low can be adequately predetermined according to the results of actual tests for the servo-stabilization of the above stated rotation system.

What is claimed is:

1. A video signal reproducing apparatus for reproducing a video signal from a recording medium having the video signal recorded in many helical tracks, each of which has one field portion of the video signal recorded therein, comprising:

a) a rotary head arranged to periodically trace the recording medium and reproduce the recorded video signal;

b) a memory arranged to receive the video signal reproduced by said rotary head and capable of storing at least one field portion of the video signal;

c) memory control means for controlling writing signals into said memory and for reading signals stored in said memory therefrom;

d) rotation control means for controlling rotation of said rotary head and outputting a rotation signal related to rotation of said rotary head; and e) mode setting means for setting said apparatus into one of a plurality of modes according to still picture reproduction time, said plurality of modes including a first still picture reproduction mode, in which said rotation control means operates to rotate said rotary head at a predetermined rotation speed and said memory control means operates to cause repetitive reading from said memory of stored signals corresponding to one field portion of said video signal, and a second still picture reproduction mode in which said rotation control means operates to cause rotation of said rotary head and said memory control means operates, to cause repetitive reading from said memory of stored signals corresponding to one field portion of said signal without using the rotation signal output from said rotation control means.

2. An apparatus according to claim 1, further comprising rotation phase detecting means arranged to produce a rotation phase detection signal according to a rotation phase of said rotary head and periodic signal generating means for generating periodic pulses at a predetermined period, without using said rotation phase detection signal.

3. An apparatus according to claim 2, wherein said memory control means includes reading address control means for controlling a reading address of said memory during said repetitive reading of stored signals from said memory, said reading address control means having address resetting means for resetting said reading address by using said rotation phase detection signal in said first still picture reproduction mode and for resetting said address by using said periodic pulses in said second still picture reproduction mode.

4. An apparatus according to claim 3, wherein said reading address control means includes an address counter and first detecting means arranged to detect a lapse of a given number of horizontal scanning periods in said reproduced video signal following a resetting of said reading address by said address resetting means and to produce a first detection pulse, said reading address control means being responsive to said first detection pulse to reset said address counter at a first given time.

5. An apparatus according to claim 4, wherein said reading address control means includes second detecting means arranged to detect a lapse of a given horizontal scanning period in said reproduced video signal following said first given time and to produce a second detection pulse, said reading address control means being responsive to both said first and second detection pulses to reset said address counter in said second still picture reproduction mode.

6. An apparatus according to claim 4, wherein, in said first still picture reproduction mode, said reading address control means is responsive to said first detection pulse and said rotation phase detection signal to reset said address counter.

7. A video signal reproducing apparatus for reproducing a video signal from a recording medium having the video signal recorded in many helical tracks, each of which has one field portion of the video signal recorded therein, comprising:

a) a rotary head arranged to periodically trace the recording medium;

b) a memory arranged to receive a video signal reproduced by said rotary head and capable of storing at least one field portion of the video signal;

c) rotation phase detecting means arranged to produce a rotation phase detection signal according to the rotation phase of said rotary head;

d) memory control means including reading address control means for controlling a reading address of said memory, said memory control means controlling writing signals into said memory and reading stored signals from said memory;

e) rotation control means for controlling rotation of said rotary head;

f) periodic signal generating means for generating periodic pulses at a predetermined period, without using said rotation phase detecting signal; and g) mode setting means for setting said apparatus into one of a plurality of modes including a first still picture reproduction mode and a second still picture reproduction mode, wherein in said first still picture reproduction mode said memory control means operates to repetitively read out one field portion of the video signal stored in said memory and said reading address control means operates to effect address reset by using said rotation phase detecting signal; and in said second still picture reproduction mode said memory control means operates to repetitively read out one field portion of the video signal stored in said memory and said reading address control means operates to effect the address reset, without using said rotation phase detecting signal and with use of said periodic pulses.

8. An apparatus according to claim 7, wherein said first still picture reproduction mode has a still picture reproduction time shorter than that of said second still picture reproduction mode.

9. An apparatus according to claim 7, wherein said periodic signal generating means includes a voltage controlled oscillator.

10. An apparatus according to claim 7, wherein said recording medium includes a magnetic tape.

11. An apparatus according to claim 7, further including a signal processing circuit for applying predetermined processing to said video signal.

12. A signal reproducing apparatus, comprising:

(a) reproducing means for reproducing an image signal from a recording medium, said reproducing means including a rotary head and rotation control means for controlling rotation of said rotary head;

(b) a memory for storing an image signal for one picture in the image signal reproduced by said reproducing means;

(c) memory control means for controlling writing and reading of said image signal into and out of said memory; and (d) mode setting means for setting said apparatus into one of a plurality of modes, said plurality of modes including a first still picture reproduction mode having a short still picture reproduction time in which said memory control means operates to repeatedly read out the image signal for one picture stored in said memory and said rotation control means operates to cause said rotary head to rotate at a predetermined speed, and a second still picture reproduction mode having a long still picture reproduction time in which said memory control means operates to repeatedly read out the image signal for one picture stored in said memory and said rotation control means operates to stop rotation of said rotary head.

13. An apparatus according to claim 12, wherein said recording medium includes a magnetic tape.

14. An apparatus according to claim 12, wherein said reproducing means further includes a signal processing circuit for applying predetermined processing on said image signal.

15. An apparatus according to claim 12, wherein said memory control means includes an address assigning circuit for assigning a write and read address of said memory.

16. An apparatus according to claim 12, wherein said rotation control means includes a rotation phase detecting circuit for detecting a rotation phase of said rotary head and for outputting a rotation phase signal.

17. An apparatus according to claim 16, wherein in said first still picture reproduction mode, said memory control means reads out the image signal for said one picture, by using said rotation phase signal, and wherein in said second still image reproduction mode, said memory control means reads out the image signal for said one picture, by using said rotation phase signal.

18. An apparatus according to claim 16, further comprising periodic signal generating means for generating a periodic pulse at predetermined periods, without using said rotation phase signal.

19. An apparatus according to claim 17, wherein in said first still picture reproduction mode, said memory control means reads out the image signal for said one picture, by using said rotation phase signal and wherein in said second still picture reproduction mode said memory control means reads out the image signal for said one picture, by using said periodic pulse.

* * * * *

UNITED STATES PATENT AND TRADEMARK OFFICE
CERTIFICATE OF CORRECTION

PATENT NO. : 5,355,256

DATED : October 11, 1994

INVENTOR(S) : Tsutomu Fukatsu et al.

It is certified that error appears in the above-identified patent and that said Letters Patent is hereby corrected as shown below:

TITLE PAGE:
Item [30]. Insert -- [30] Foreign Priority Data
        June 24 1987 [JP] Japan ......SHO62-158054
        June 26 1987 [JP] Japan ......SHO62-160584 --.

Col. 1, line 30.  Change "not-in" to -- not in --.

Col. 1, line 34.  After "in" insert -- a --.

Col. 1, line 62.  Change "2(a-i)" to -- 2(a) --.

Col. 1, line 63.  Change "2(d-iii)" to -- 2(d) --.

Col. 3, line 32.  Change "2(a-i)" to -- 2(a) -- and change "2(b-iii)" to -- 2(f) -- and change "2(a-ii)" to -- 2(b) --.

Col. 3, line 33.  Change "2(a-iii)" to -- 2(c) --.

Col. 3, line 37.  Change "2(b-i)" to -- 2(d) --.

Col. 3, line 40.  Change "2(a-i)" to -- 2(a) --.

Col. 3, line 41.  Change "2(b-ii)" to -- 2(e) -- and change "2(b-iii)" to -- 2(f) --.

Col. 3, line 47.  Change "2(c-i)" to -- 2(g) --.

Col. 3, line 49.  Change "2(c-ii)" to -- 2(h) --.

Col. 3, line 50.  Change "2(c-iii)" to -- 2(i) --.

Col. 4, line 36.  Change "2(c-ii)" to -- 2(h) --.

Col. 4, line 37.  Change "2(c-iii)" to -- 2(i) --.

UNITED STATES PATENT AND TRADEMARK OFFICE
CERTIFICATE OF CORRECTION

PATENT NO. : 5,355,256

DATED : October 11, 1994

INVENTOR(S) : Tsutomu Fukatsu et al.

It is certified that error appears in the above-identified patent and that said Letters Patent is hereby corrected as shown below:

Col. 5, lines 58-59. Change "2(a-i)-2(a-iii), 2(b-i)-2(b-iii), 2(c-i)-2(c-iii), 2(d-i)-2(d-iii)" to -- 2(a) to 2(l) --.

Col. 6, line 15. Change "2(d-i), 2(d-ii)" to 2(k) --.

Col. 6, line 16. Change "2(d-iii)" to -- 2(l) -- and change "2(d-i)" to -- 2(j) --.

Col. 6, line 20. Change "2(d-ii)" to -- 2(k) -- and change "2(d-iii)" to -- 2(l) --.

Col. 6, line 24. After "falling" insert -- edge --.

Col. 6, line 25. Change "(a-ii)" to -- (b) --.

Col. 7, line 3. After "produces" insert -- a --.

Col. 7, line 28. Delete "and".

Col. 7, line 66. Change "according" to -- accordingly --.

Col. 8, line 36. Change "2(d-i)" to -- 2(j) --.

Col. 8, line 37. Change "2(d-ii)" to -- 2(k) --.

UNITED STATES PATENT AND TRADEMARK OFFICE
CERTIFICATE OF CORRECTION

PATENT NO. : 5,355,256

DATED : October 11, 1994

INVENTOR(S) : Tsutomu Fukatsu et al.

It is certified that error appears in the above-indentified patent and that said Letters Patent is hereby corrected as shown below:

Col. 11, line 39. Change "1" to --$\ell$-- (both occurrences).

Signed and Sealed this

Seventh Day of March, 1995

Attest:

BRUCE LEHMAN

Attesting Officer

Commissioner of Patents and Trademarks